United States Patent [19]

Kaminski

[11] 4,363,982
[45] Dec. 14, 1982

[54] DUAL CURVED INLET GAP PICKUP WEDGE

[75] Inventor: Christopher A. Kaminski, Scotia, N.Y.

[73] Assignee: General Electric Company, Schenectady, N.Y.

[21] Appl. No.: 228,471

[22] Filed: Jan. 26, 1981

[51] Int. Cl.³ .............................................. H02K 1/32
[52] U.S. Cl. ...................................... 310/61; 310/55; 310/214
[58] Field of Search ................... 310/52, 53, 55, 56, 310/57, 58, 60 R, 61, 64, 65, 59, 44, 214, 215

[56] References Cited

U.S. PATENT DOCUMENTS

| | | | |
|---|---|---|---|
| 2,134,795 | 11/1938 | Myers | 310/44 |
| 2,986,664 | 5/1981 | Willyoung et al. | 310/61 |
| 3,348,081 | 10/1967 | Willyoung | 310/55 |
| 3,435,263 | 3/1969 | Willyoung | 310/61 |
| 3,440,462 | 4/1969 | Willyoung | 310/61 |
| 3,995,180 | 11/1976 | Giles | 310/55 |
| 4,152,610 | 5/1979 | Wallenstein | 310/214 |

Primary Examiner—R. Skudy
Attorney, Agent, or Firm—John F. Ahern

[57] ABSTRACT

In a gas-cooled generator or other dynamoelectric machine, wedges are provided for retention of the field windings and for introducing the cooling fluid into passages through the field windings to provide rotor cooling. In particular, the wedge of the present invention possesses pairs of bidirectionally curved inlet passages so as to smoothly convert a tangential flow of gas into a gas flow having both radially inward and longitudinal components. The wedges are particularly useful in cooling dynamoelectric machine rotors having a diagonal flow, gap pickup cooling system.

5 Claims, 5 Drawing Figures

DUAL CURVED INLET GAP PICKUP WEDGE

BACKGROUND OF THE INVENTION

This invention relates to rotor cooling systems for dynamoelectric machines and in particular to slot wedges which may be employed to facilitate the flow of cooling fluid.

Dynamoelectric machines, particularly those employed in power generation, generally comprise a cylindrical slotted stator core through which conductive stator windings are disposed and a cylindrical, slotted rotor core through which conductive rotor winding bars are disposed. The rotor windings are conventionally connected to energizing and excitation circuitry through the use of slip rings and carbon brushes or other electromagnetic coupling means. The rotor provides a substantially constant magnitude, rotating field which is radially directed with respect to the generally cylindrical rotor assembly. Because of the rotary motion, the field lines associated with the magnetic flux are made to cross stationary bars of insulated conductive material in the stator assembly so as to induce an electrical voltage in the stator winding bars. Direct electrical connections to the bars in the stator winding provide three-phase electrical power such as that generated by most electric utilities. Various rotor and stator constructions are conventionally known in the art.

Because of the generally increasing costs associated with certain fossil fuels, the energy efficiency of power-generating equipment has become a highly significant performance parameter. A large amount of energy loss in a conventional dynamoelectric generator occurs in the rotor assembly and its associated electrical windings. Because of the relatively large amounts of electrical power which are supplied through the rotating field windings, undesirable thermal energy is produced in the rotor. (Similarly, resistive heating losses also occur in the stator windings. However, the stator windings may be relatively easily cooled, for example, by water. Thus, because of the fixed position of the stator, its cooling is relatively easily accomplished.) The rotor, however, requires sophisticated cooling designs. It is to be noted that if insufficient cooling occurs for the rotor, the resultant temperature increase raises the resistivity of copper field windings, thereby further increasing the resistive heating losses. In short, it is seen that rotor cooling is essential and that improvements in rotor cooling are significant since a large source of energy loss presently occurs in dynamoelectric machine rotors.

A clever means for cooling the field windings on the rotor is illustrated in U.S. Pat. No. 2,986,664 issued May 30, 1961 to David M. Willyoung et al. This patent describes a diagonal flow cooling system for a set of rotor windings in which two sets of diagonally directed passages are disposed through the rotor windings. In this patent, the field winding bars in any given slot have a sequence of diagonally directed passages extending in one downward direction along one side of the winding bars and a second set of diagonally directed passages directed in a diagonally opposite direction along the other side of the winding bars. This diagonal flow cooling system is particularly illustrated in FIG. 4 of the above-mentioned Willyoung et al patent, which patent is hereby incorporated herein by reference as background material for the present invention. Cooling gas is introduced into these diagonal passages through a system of scoops and ducts located in the wedges which are used to retain the winding bars in the rotor core slots. Because of the relatively large diameters of the rotors and because of their rotational speed, the retention function of the wedges is important because of the high centrifugal forces developed during operation.

It is to be particularly noted that, with respect to the above-mentioned patent to Willyoung et al, flow division for separating the two diagonal flow directions does not occur in the wedge itself. This function is performed by a flow-dividing vane disposed across the holes located in a creepage block.

Rotor cooling and the importance of the gap pickup wedges is recognized in U.S. Pat. No. 3,440,462 issued Apr. 22, 1969 to David M. Willyoung (as sole inventor). This patent recognizes the difficulty of machining curved passages in the rotor wedges and accordingly proposes a wedge design in which the passages are located at the end of rotor segments so that they may be easily machined. This rotor wedge design facilitates the transition from a tangential flow to a strictly downward (or inward) directed radial flow. However, there is no provision for facilitating the transition of the flow into components having oppositely directed longitudinal velocity components. Such a flow dividing requirement appears to be inconsistent with the end-machining of the gap pickup passages. Furthermore, at least a portion of the flow splitting function resides in the dividing vanes which straddle the holes in the creepage block. Nonetheless, the patent to Willyoung appreciates the fact that the tendency for flow separation is increased if there are discontinuities or sharp changes in the direction of the flow. Furthermore, no provision is made in the patent to Willyoung to facilitate a transition from a tangential flow to a flow directed radially inward and longitudinally outward. Since the vanes across the holes in the creepage block contribute to a pressure drop across the creepage block, they tend to reduce the rotor cooling capacity and to lower efficiency more than is necessary in light of the present invention.

The importance of rotor cooling is also recognized in U.S. Pat. No. 3,995,180 issued Nov. 30, 1976 to Walter B. Giles. This patent is solely directed to increasing the flow of cooling gases through the exit portions of the diagonal flow rotor cooling system. However, no means is provided for transitioning the velocity of the gas flow from a radial and longitudinal direction to a tangential exit direction. Moreover, flow separating means are still provided in the creepage block itself.

It is also recognized by those skilled in the generator arts that reducing the size of the creepage block means that greater space may be provided in the rotor slot for the conductive rotor windings. Thus, since a larger cross-sectional area may be allocated to the winding conductors, the resistance of the field windings may be significantly reduced. This reduction naturally reduces the resistive heating losses in the rotor and can further increase overall generator efficiency.

SUMMARY OF THE INVENTION

In accordance with a preferred embodiment of the present invention a wedge for use in a rotor slot comprises an elongate body with ridge portions for insertion and retention of the wedge in the rotor slots, the wedge having at least one pair of bidirectionally curved passages, these passages being curved in opposite longitudinal directions whereby the transition between a tangential flow of gas to a flow of gas which is directed radially inward and longitudinally outward is readily achieved. The cross sections of the passages may likewise be varied between the inlet and the outlet passage portions to provide a smooth match between the shape of the inlet opening and the outlet opening. The wedges of the present invention preferably comprise a material such as aluminum which is an easily machinable material. However, because of the relatively intricate passage shapes manufacture of the wedges preferably employs powdered metallurgy technology.

In another embodiment of the present invention a diagonal flow gap pickup rotor employs the above-described wedge in conjunction with a creepage block having a lesser thickness than previously employed creepage blocks. The use of such a creepage block rather than a relatively thick creepage block permits the use of field winding conductors having a larger cross-sectional area and therefore a lower resistance. Thus not only is cooling of the field windings improved with the present invention, but the present invention also permits the use of a thinner creepage block since the creepage block no longer serves a flow diverting function.

Accordingly, it is an object of the present invention to provide an efficient gap pickup wedge for a dynamoelectric machine rotor.

It is also an object of the present invention to provide a more efficiently cooled dynamoelectric machine rotor.

It is a further object of the present invention to provide a dynamoelectric machine rotor in which the electrical resistance of the field winding bars is reduced.

DESCRIPTION OF THE FIGURES

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
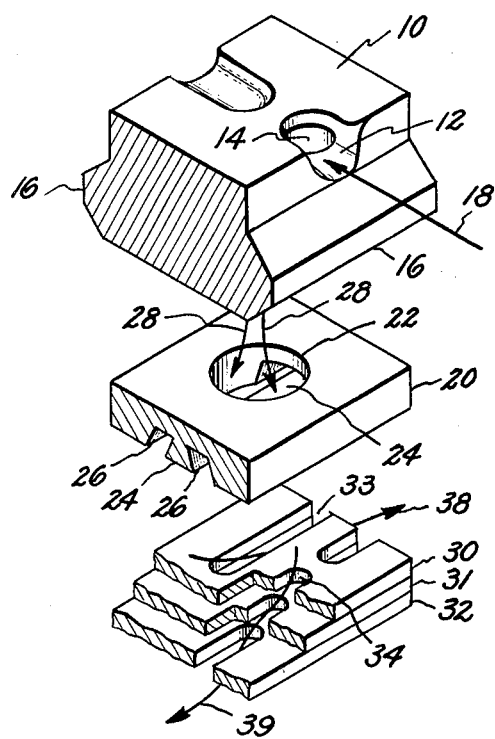
FIG. 1 is an exploded isometric view illustrating the flow of cooling gas through prior art wedges, creepage blocks and winding bars.

FIG. 1 illustrates an exploded view of the prior art structure used for introducing circulating cooling fluid, such as hydrogen, into the passages within the rotor winding bars of a dynamoelectric machine. For clarity, the view shown is that of a short section of the wedge creepage block and the winding bars immediately beneath them in the rotor slot. In particular wedge 10 comprises an elongate member (only a short length of which is shown) having entrance opening 14 located along an upper portion of the wedge body. Entrance opening 14 is surrounded by and contoured to match a scoop-shaped portion 12. This scoop serves to direct the cooling fluid into the entrance 14 upon rotation of the rotor in the proper direction. One of the functions of the wedge is to accept a tangential flow of gas indicated by arrow 18 and divert it into a directly downward, radial direction indicated by arrows 28. A second and a major function of the wedge 10 is to retain the rotor winding bars (such as 30, 31 and 32) within the slot during rotation. Because of the relatively large diameters of currently produced dynamoelectric machine rotors, and because of the relatively high rotational velocity, the centrifugal force applied to the wedges by the rotor windings is significant. To retain the rotor windings within the slots, ridges or protrusions 16 extend along the length of the wedge body and are shaped to match corresponding dovetail shaped channels in the rotor teeth.

Beneath the wedge 10 there is a disposed creepage block 20. This block generally comprises a high dielectric strength plastic or plastic and glass fiber material. It further possesses opening 22 which is aligned with a corresponding opening in the bottom of wedge body 10 from which cooling gas flows, as indicated by arrows 28. It is specifically noted here that upon exiting from the opening in the bottom of wedge 10, the cooling gas has a radially downward direction of flow. This is true even after the flow of gas is divided by vane 24 which spans opening 22 in the creepage block 20. Vane 24 divides the downwardly directed flow of gas into two substantially equal components. It is nonetheless at this point, however, that an undesirable pressure drop may occur in the flow across the opening in the creepage block. The cooling fluid flow must be divided because there are basically two kinds of entrance openings in the winding bars of a diagonal flow cooled machine. On one side of the winding bars the flow is directed radially downward (or inward) along a first longitudinal direction, such as indicated by arrow 38 in FIG. 1. The flow passages in the winding bars for this flow direction is typified by passage 33. Another set of passages on the other side of the winding bars, as typified by passage 34 has flowing therethrough the other portion of the divided gas which flows in passages such as 34 in a radially downward but in an opposite longitudinal direction as indicated by arrow 39. Thus, there are basically two gas flows leaving each opening in the creepage block, both of which possess velocity components having a radially downward direction and longitudinal components which have opposing directions. These longitudinal directions of flow exist because of the staggered and shifted locations of the holes in the rotor winding bars, the first three of which 30, 31, 32 are shown.

The creepage block serves two basic functions. First of all, it acts as an insulating dielectric material to prevent arcing between the rotor winding bars, especially winding bar 30, and the wedge, which typically comprises aluminum. Potentially, arcing may also occur between the winding bars and exposed portions of the metal teeth of the rotor core. Additionally, the creepage block possesses flow dividing vanes 24 and channels 26 defined along the bottom of the creepage block and extending in a longitudinal direction. These channels 26 further facilitate the flow of gas into the passages in the rotor winding bars. Thus, in FIG. 1 the wedge 10, creepage block 20 and windings 30–32 are aligned so that tangential cooling gas flow entering opening 14 is ultimately directed to passages 33 and 34 in the rotor winding bar stack.

Figure 2A:
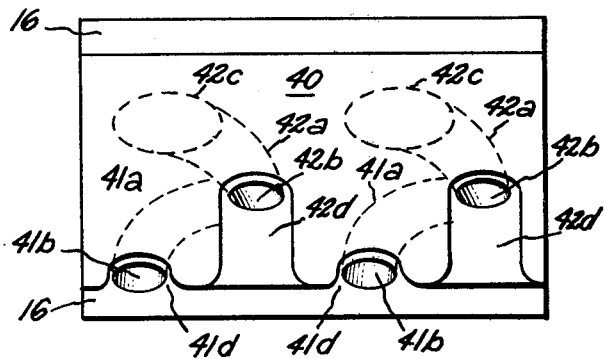
FIGS. 2A, 2B and 2C are, respectively, top, side and bottom views of a wedge in accordance with the present invention.
Figure 2B:
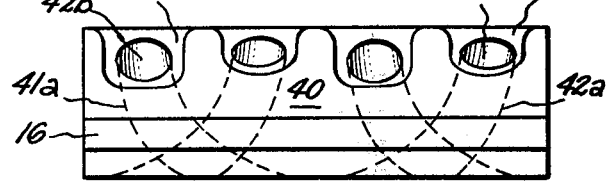
Figure 2C:
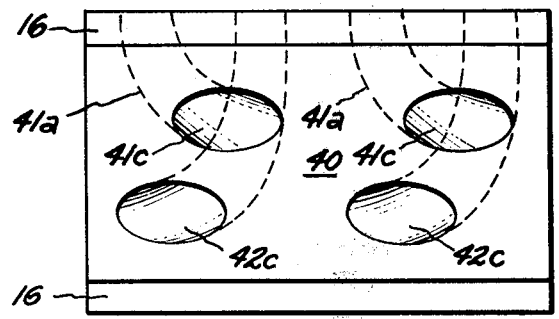

FIGS. 2A, 2B and 2C illustrate, respectively, the top, side and bottom views of a wedge in accordance with a preferred embodiment of the present invention. The hidden lines of the passages through the wedge are shown dotted. In each case it is seen that the wedge also possesses protrusions, ridges, keys or dovetails 16 which are used to retain the wedge and the electrically conductive rotor winding bars in the slots. A significant feature of the wedge of the present invention is that there are twice as many cooling gas entrances than are found on prior art designs. The wedge of the present invention is designated in each of FIGS. 2A, 2B, and 2C by reference numeral 40. Reference numeral 41 generally refers to a set of wedge passageways servicing a single side of the winding bar stack. Reference numeral 42 refers to a passage through the wedge which services the passages along the other side of the rotor winding bars. In particular, reference numeral 41a refers to the passage itself. Reference numeral 41b to the entrance opening, reference numeral 41c to the exit opening and reference numeral 41d to the scoop-shaped portion of the wedge which acts, upon rotation, to direct cooling fluid into the opening. Similar reference numeral designations are used for the other of the pair of inlet openings employed. It is to be noted that in the present invention the inlet openings now appear in pairs, such as 41b and 42b. Because of the courses in which these passages bend in extending to their desired exit openings, a somewhat larger scoop 42d may be provided for one of the passages as shown. This permits the length of the two passages to be approximately the same so that equal volumes of cooling fluid are provided to each of the two sides of the winding bars in a rotor slot. A significant advantage of the configuration of the wedge of the present invention is that the passages are bidirectionally curved. That is to say, the passages are curved not only to impart a radially downward (inward) velocity to the fluid flow but also to impart a longitudinal velocity to more closely match the direction of fluid flow in the rotor winding passages. Furthermore, there is no longer a need for providing flow division for the two sides of the winding bars. This function is now replaced by the rotor wedge of the present invention which exhibits three significant advantages. First, there are provided twice as many cooling passage openings as before, thereby significantly increasing the overall flow of cooling fluid to the rotor windings. As pointed out above, this is highly desirable since thermal increases in this portion of the machine reduce overall efficiency. Second, the flow of a cooling fluid such as hydrogen is smoothly transitioned not only in a radially downward direction but is transitioned in such a manner as to match the direction of flow through both sides of the stack of winding bars. This is significant because the longitudinal components of the velocities of gas flow through one side of the bars as compared with the flow along the other side of the bars is oppositely directed. The present invention is closely adapted to this by providing the flow for each side along an optimal direction. Third, there is no longer any need for providing a creepage block which also functions as a flow divider. This fact has implications which are discussed below.

Figure 3:
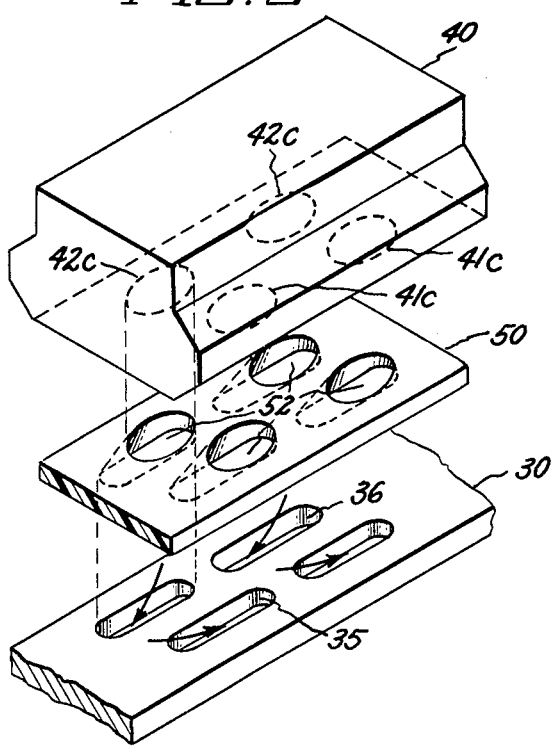
FIG. 3 is an exploded isometric view illustrating the use of the wedge of the present invention with a creepage block.

Because the creepage block no longer must serve a flow diverting function, it can be made less thick and advantage may be taken of more desirable creepage block configurations. In particular, a creepage block 50, such as that shown in FIG. 3, may be employed in which the block possesses holes 52 which align with the exit openings 41c and 42c along the bottom of the wedge of the present invention. For clarity in FIG. 3, only the exit openings of the wedge are shown, the entrance openings, scoops and passages are omitted for easier viewing. Furthermore, the edges of the holes 52 may be shaped and beveled so as to provide a smooth transition between the elliptical exit openings 41c and 42c and the elongated oval openings 35 and 36, for example, in the top winding bar 30. Creepage block 50 is dimensioned so as to fit snugly over the stack of rotor winding bars in the slot. Additionally, the passages themselves in the wedge body also exhibit a smooth transition from a near-circular entrance opening to a more elliptical exit opening.

The fact that the wedge of the present invention permit the use of a thinner creepage block implies that a greater percentage of the rotor slot may be filled with the conductive winding material, typically copper. This means that the resistance of the rotor winding is lower, and therefore that rotor losses are significantly reduced. Furthermore, the added cooling capabilities concomitant with the wedge design herein also result in greater energy efficiency.

While the wedge of the present invention may be machined from a solid block of material, this procedure may be time consuming and may not always produce interior passage contours with walls as smooth as may be desired. However, the wedge of the present invention may be fabricated using powdered metal metallurgical processes in which a powdered metal alloy is placed in a mold along with plugs of a solid material having the shape of the desired passages. The powdered alloy is then heated, under pressure if necessary, to produce a wedge in accordance with the present invention. The solidified metal is removed from the mold, the plugs are removed to form the passageways, and final machining and polishing to shape are performed as needed.

From the above it may be appreciated that the present invention provides a wedge for use in a dynamoelectric machine which significantly increases the volume of cooling gas fluid that may be delivered to the rotor windings for cooling. Furthermore, the present invention obviates the necessity of providing flow division in a creepage block between the two sides of a winding bar stack. And lastly, the present invention permits the use of a smaller creepage block and lower resistance rotor winding bars so as to decrease losses in the rotor winding.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A wedge for use in the rotor slots of dynamoelectric machines in conjunction with conductor bars within said slots especially such machines employing a gap pickup system for circulating cooling fluid through the rotor, said wedge comprising:
   an elongate body having ridge portions extending longitudinally outward along the sides thereof for insertion and retention of the wedge in slots in the rotor;
   said wedge having a plurality of pairs of bidirectionally curved passages therein, to direct cooling fluid to respective cooling passages in said conductor bars and impart to said fluid flow directions having both a radially inward component and a longitudinal component, said passages each having an entrance along an upper portion of said wedge, said entrances having scoop-shaped port holes for directing a cooling fluid into said passages upon rotor turning;

said passages terminating in exit openings on the bottom side of said wedge, a first of said passages of each of said pairs being curved to direct the flow of cooling fluid in a first exit direction wherein the longitudinal component thereof is in a first direction and the second of said passages being curved to direct flow of cooling fluid in a second exit direction, wherein the longitudinal component thereof is opposite in direction to the longitudinal component of said first fluid flow.

2. The wedge of claim 1 in which said elongate body is formed from powdered metal heated in a mold with removable plugs which define the configuration of said curved passages therein.

3. The wedge of claim 1 in which said passages exhibit a continuously varying curvature and cross section ranging from a circular entrance to an elliptical exit.

4. A fluid-cooled dynamoelectric machine rotor comprising:
a cylindrical metallic rotor core with longitudinally extending radial slots therein, said slots defining teeth having longitudinally extending channels along the sides thereof;
a plurality of electrically conductive field windings disposed in layers within said slots;
said windings having a first and second set of non-intersecting diagonally directed cooling passages, said winding passages extending longitudinally and radially, the passage direction in said first and second sets having oppositely directed longitudinal components;
a plurality of wedges wedging said field windings in said slots and having respective pairs of cooling fluid channels therein, each of said channels being bidirectionally curved to direct cooling fluid in continually curved paths in radially inwardly and longitudinal directions so as to deliver fluid to said sets of diagonally directed cooling passages in said windings for introducing cooling fluid into the rotor windings, disposed so as their ridges engage the channels in said teeth and disposed in alignment with the winding passages; and
wedge means for discharge of the cooling fluid.

5. The rotor of claim 4 further comprising a creepage cap disposed between said wedges and said windings, said cap possessing holes therein in alignment with the passages in said windings and the passages in said wedges of claim 1.

* * * * *